United States Patent

Jochim

[15] 3,684,843

[45] Aug. 15, 1972

[54] RETARDED CLOCK DEVICE WITH PIN BALL TYPE SWITCH ACTUATORS

[72] Inventor: La Vergne C. Jochim, Buena Park, Calif.

[73] Assignee: Ti-Mind Incorporated, Buena Park, Calif.

[22] Filed: Oct. 28, 1970

[21] Appl. No.: 84,822

[52] U.S. Cl...................200/35 R, 200/61.11, 200/41

[51] Int. Cl..............................H01h 3/16, H01h 7/08

[58] Field of Search.....200/35, 36, 37, 38, 52, 61.11, 200/153 T, 41

[56] References Cited

UNITED STATES PATENTS

| | | | |
|---|---|---|---|
| 2,870,279 | 1/1959 | Cohn | 200/61.11 |
| 2,254,589 | 9/1941 | Aamodt | 200/38 C X |
| 2,426,048 | 8/1947 | Prentice | 200/61.11 X |
| 2,761,925 | 9/1956 | Gray | 200/61.11 |

FOREIGN PATENTS OR APPLICATIONS

| | | | |
|---|---|---|---|
| 1,126,964 | 4/1962 | Germany | 200/153 T |

*Primary Examiner*—J. R. Scott
*Attorney*—Lyon & Lyon

[57] ABSTRACT

A signaling device is disclosed in which an object such as a ball is placed in an opening in a generally horizontal disc. Although the opening is large enough for the passage of the ball, the ball is held in the opening by a lower concentric disc. This lower concentric disc also contains an opening which will become aligned with the opening in the upper disc which contains the ball. One of these two discs is rotated with respect to the other and when the opening in the lower disc becomes aligned with the opening which holds the object in the upper disc, the object falls through both openings and activates a sensing device which may be connected to an alarm, appliance or the like. One embodiment of the device utilizes a clock face with openings in the upper disc at 30-minute intervals, the lower disc has a single opening which corresponds with the hour hand of the clock. Thus, if one wishes to signal or activate an appliance at a future time, he places an object in the opening corresponding to that time. When that time arrives, the hole in the lower disc becomes aligned with the hole and object in the upper disc and the object falls through activating a sensing device. Means to discriminate between objects of different sizes are also disclosed.

10 Claims, 8 Drawing Figures

INVENTOR
LA VERGNE C. JOCHIM

BY Lyon & Lyon

ATTORNEYS

INVENTOR
LA VERGNE C. JOCHIM
BY Lyon & Lyon
ATTORNEYS

RETARDED CLOCK DEVICE WITH PIN BALL TYPE SWITCH ACTUATORS

BACKGROUND OF THE INVENTION

The field of the invention is signaling devices which are capable of activating a signal, moving an arm or turning on or off an appliance at some predetermined time.

A common prior art device utilizes a 24-hour clock having a face plate which makes one revolution every 24 hours. Contact points are attached to the outer circumference of the face plate. These contact points actuate an electrical switch thereby enabling the user to activate an appliance at a predetermined time. Typically, two distinct shapes of contact points are provided one of which is capable only of turning on an appliance and the other type is capable only of turning off an appliance. By the positioning of a number of such contact points around the periphery it is possible to turn on and off an appliance several times during the day. Such devices, unless manually reset, will continue to turn on and off a switch at the same time every day. Such devices may be readily adapted to function only on certain days of the week but they still will repeat their signal on that day, week after week. Thus, such devices are not useful for scheduling events that differ from day to day and from week to week.

SUMMARY OF THE INVENTION

The signaling device of this invention utilizes the dependable concept of gravity which causes an object such as a ball to drop when an opening in a rotating disc is aligned with the opening in which the ball has been placed. The device becomes a remarkably easy to use scheduling device for a day's activities when the upper disc is marked with the numbers of a clock and the openings are placed at half-hour or quarter-hour intervals. The lower disc is marked with an hour hand and a single opening aligned with the hour hand is placed so that it passes beneath each of the openings in the clock face. Thus, in use, if one wished to be reminded of a 3 o'clock appointment, one would simply place a ball in the hole opposite 3 o'clock. The ball would be held up by the lower disc until the hole in the lower disc was opposite 3 o'clock at which time the ball would drop which can be readily made to activate a signal. Further, more than one ball may be placed in the openings in the clock face resulting in more than one signal during the day.

It is also possible to adapt the system which senses the dropping of the balls to give a different signal depending on the size of the ball used. One such system utilizes a set of spaced rails which will carry the balls over a certain size and pass through all balls which are smaller. Balls of two or more different sizes can thus result in different signals. For instance one size ball might turn on an appliance and another size turn it off. One size ball could sound a buzzer whereas another size could cause the physical movement of a lever.

A particularly simple system of sensing device utilizes a transport tray which is periodically moved from a starting position to an emptying position. If the transporter tray has a side wall height below the maximum height of the ball used, then the presence of a ball in the transporter tray can be made to trip a mechanical arm or an electrical contact switch mounted above the tray.

Thus, the periodic movement of the transporter tray will cause no signal unless a ball is contained in the tray. If there is a hole in the bottom of the transporter tray and a corresponding hole in the shelf on which the tray rests, then the tray will automatically empty itself when these two holes become aligned.

The use of a transporter tray with more than one opening can be combined with means for discriminating between different sizes of balls. For instance, utilizing the spaced rail technique described above, a small ball can be made to fall in one opening in the transporter tray and a larger ball fall in another hole. By the positioning of two separate contact switches a different signal can be obtained by the lateral movement of a transporter tray.

DESCRIPTION OF THE PREFERRED EMBODIMENTS

Figures 1, 2:
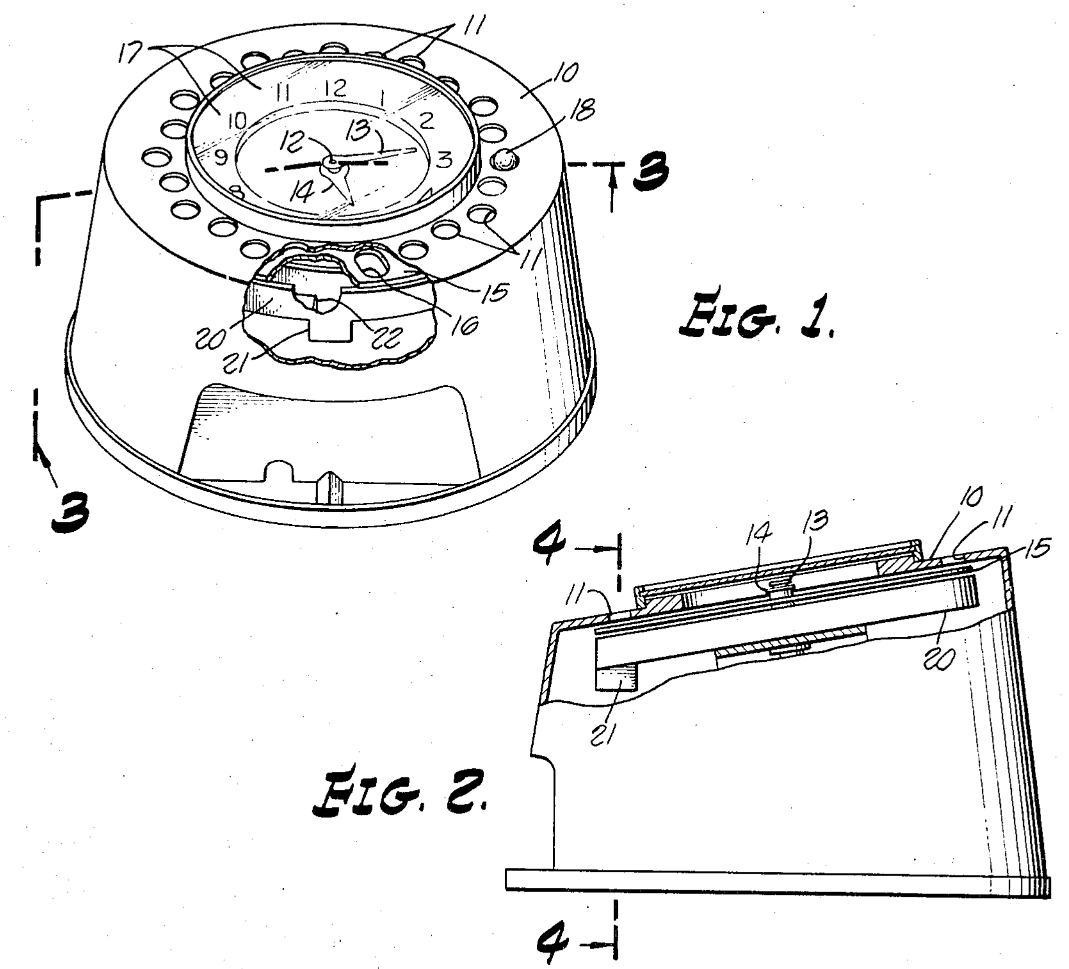
FIG. 1 is a perspective view of the signaling device of the present invention.
FIG. 2 is a side elevation, partially cut away showing the annular trough of the present invention.

Turning now to FIG. 1, there is shown a perspective view of the signaling device having a generally horizontal but slightly sloping disc 10 having a series of 24 openings such as those depicted by reference character 11. These openings 11 are equally spaced and located concentrically about two circles about the clock center 12. Minute hand 13 rotates about center 12 in a conventional manner described below. Hour hand 14 moves with the lower disc 15. Lower disc 15 has a single hole 16 which is elongated and generally the same size as openings 11 and is located at a point in lower disc 15 so that it passes under each of the openings 11 as the lower disc rotates. The hole 16 is in line with the hour hand 14. Clock numeral indicia 17 are marked on the surface of the upper disc 10. A ball 18 is shown in the opening 11 which is next to the 3 o'clock indicia. At this point, it can readily be seen that rotation of lower disc 15 in the manner of a conventional hour hand will cause the ball 18 to drop through the single hole 16 when the clock moves to its 3 o'clock position.

After the ball has dropped through any of the openings 11 and the single hole 16 it falls into an annular trough 20 which is shown in the cut away portion of FIG. 1 and in FIG. 2. The trough has an exit spout 21 which is located below an opening 22 at the low point of the trough. Thus, a ball falling through any of the 12 holes will roll down hill through opening 22 and through 21 into the mechanism below.

Figure 3:
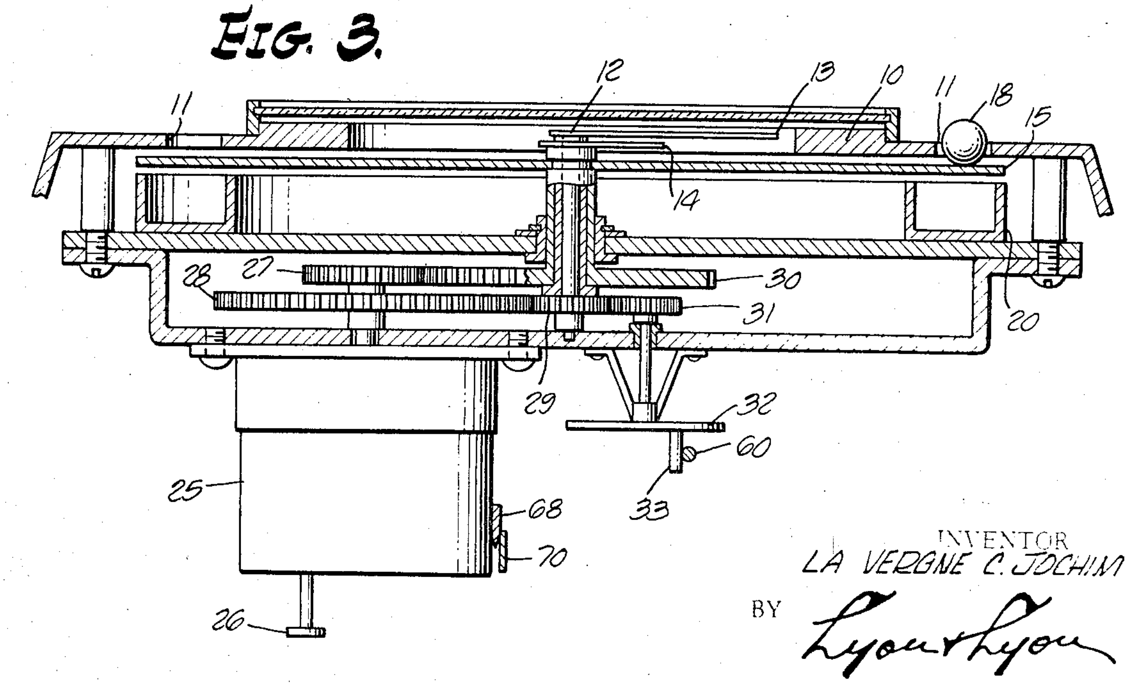
FIG. 3 is an enlarged cross sectional view taken along lines 3—3 of FIG. 1.

The cross sectional view of FIG. 3 shows a clock motor 25 with a time setting knob 26. The clock motor 25 drives gears 27 and 28 at a constant speed. These in turn drive a gear 29 affixed to the lower disc 15 and gear 30 affixed to the minute hand 13. The gear ratios are chosen in the conventional manner so that the minute hand 13 revolves 12 times for every revolution of the hour hand 14 and lower disc 15. Gear 30 drives 31 which in turn causes transporter drive wheel 32 to rotate once every hour. Transporter wheel 32 has a drive pin 33 the function of which will be described below. As can be clearly seen in FIG. 3, ball 18 is held in opening 11 by lower disc 15.

Figure 4:
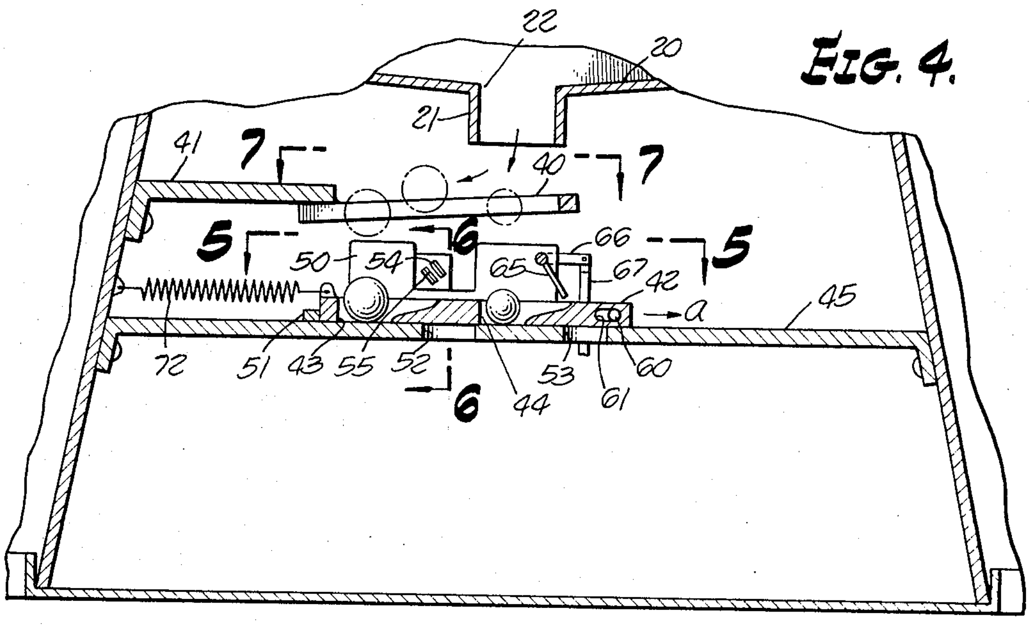
FIG. 4 is an enlarged cross sectional view taken along lines 4—4 of FIG. 2.
Figures 5, 6:
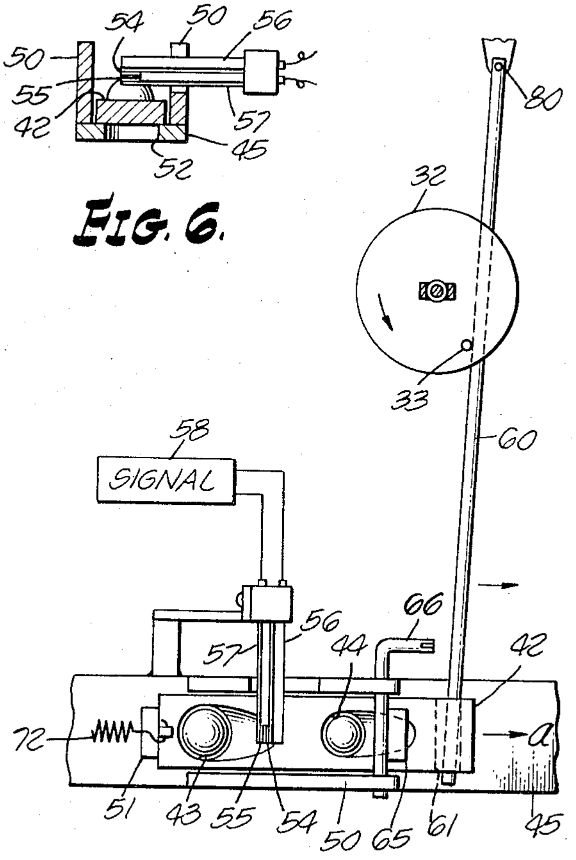
FIG. 5 is a plan view of the transporter tray drive assembly of the present invention taken along line 5—5 of FIG. 4.
FIG. 6 is a cross sectional view of the transporter tray and switch taken along line 6—6 of FIG. 4.
Figure 7:
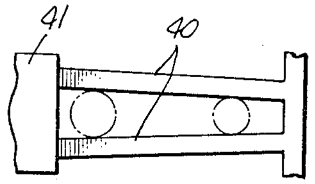
FIG. 7 is a plan view of the transporter rails of the present invention taken along line 7—7 of FIG. 4.

The details of the ball transporter and discriminating systems are shown in FIGS. 4 through 8. As shown in FIG. 4, annular trough 20 and exit spout 21 will guide the ball downwardly above discriminating rails 40 which are adhered to brace 41. These rails are diverging as shown in FIG. 7 so that a smaller ball falling through exit spout 21 will pass directly through discriminating rails 40 whereas a larger ball will be held up by these rails until it has rolled downwardly to a point where the distance between the rails is equal to its diameter when it will fall through. A transporter tray 42 has two openings 43 and 44. When the tray 42 is in the position shown in FIG. 4, the shelf 45 forms a bottom to openings 43 and 44 thereby holding a ball in either of these openings.

A smaller ball will fall directly through discriminating rails 40 and into opening 44 and a larger ball will roll along rails 40 until it falls into opening 43.

As shown in FIG. 6, the transporter tray 42 is guided by side rails 50. The transporter tray is caused to move laterally in the direction of arrow *a* by the movement of transporter tray driving rod 60 in opening 61. As the tray is moved laterally, it can be seen that openings 43 and 44 will become aligned with openings 52 and 53 in the shelf 45. When this happens, a ball resting in either of these openings will fall through into a storage area below. A pair of electrical contacts 54 and 55 are maintained above transporter tray 42 and are positioned so that a larger ball in opening 43 will cause these contacts to be brought together when the transporter tray moves the ball in the direction of arrow *a* of FIG. 4. Electrical contacts 54 and 55 are mounted at the ends of flexible arms 56 and 57 shown in FIG. 6. This permits a deflection of the electrical contacts and permits the passage of a ball in opening 43 beneath these contacts. When this electrical contact is made, an electrical signal 58 is activated which may readily be adapted to turn on or off an appliance, activate a sound signal, a light signal, or the like.

Figure 8:
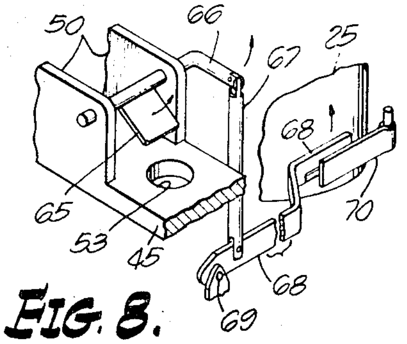
FIG. 8 is an enlarged perspective view of the mechanical switch assembly.

The details of a mechanically activated signaling device are shown in FIG. 8. Contact member 65 is affixed to rotatable arms 66 which in turn is attached to arm 67. Arm 67 is capable of raising alarm wedge 68 which is pinned at 69. When alarm wedge 68 is raised, it permits buzzer 70 to vibrate thus sounding an alarm. As can be readily seen in FIG. 4 the lateral movement of transporter tray 42 will cause a ball in opening 44 to raise arm 66 thereby withdrawing wedge 68 from the buzzer thereby sounding an alarm during the time which the ball is passing under the contact member 65.

The periodic lateral movement of transporter tray 42 is caused by the movement of transporter tray driving rod 60. Driving rod 60 is held at one end by pin 80 and at its other end by opening 61 in transporter tray 42. At an intermediate point along the rod, a pin 33 is mounted on drive wheel 32 causing a pivoting of rod 60 about pin 80. As explained above, transporter drive wheel 32 is driven by a gear which drives the minute hand of the clock and rotates once every hour. This rotating speed, of course, is selective, and for other purposes a slower or faster gear may be used. The placement of pin 33 is such that the transporter tray is in its initial position against end stop 51 at the time when a ball may enter the transporter tray. Thus, in the particular device shown, the transporter tray should be resting against end stop 51 on each hour. As wheel 32 rotates, driving rod 60 is held against pin 33 by spring 72 which also causes the transporter tray to return to its initial position. The result is that transporter tray 42 will be periodically moved laterally in the direction of arrow *a* and returned to its initial position. When a smaller ball has dropped in the trough 20 and consequently into opening 44, it will activate a mechanical arm. When a larger ball drops into trough 20 and consequently into opening 43, it will activate an electrical signal. It is, of course, possible to utilize two electrical signals or two mechanical arms.

It would be possible to have more than two different sizes of balls or an extension of discriminating rails 40 and additional openings in transporter tray 42. Further, other switching devices could be placed under exit spout 21 which could be activated by the weight of the ball or by the electrical conductivity of a conductive ball. For instance, conductive rails positioned like discriminator rails 40 could be caused to complete an electrical circuit by a conductive ball. A manual signal canceling system can be made by the addition of an extending arm on transporter tray 42 (not shown). The manual movement of tray 42 in the direction of arrow *a* will emply the tray.

Balls of different colors can also be used to indicate different functions. This could be combined with the mechanical function of the ball. For example, larger balls could be green and an "on" switch could be activated by larger balls. The smaller balls could be red and this could be made to activate an "off" switch. Thus, if one wanted to turn on an appliance for a period of 3 hours he would put a green ball at one opening and a red ball at the opening 3 hours apart from the first opening.

Of course, the number of openings is not limited to 24 and is limited only by the surface area of the upper disc. A greater number of openings can be permitted if the openings are staggered as on two or more concentric circles. It is then merely necessary to change the shape of the opening in the lower disc to an oblong so that objects placed in either ring of openings will be caused to fall through into the annular through. It is also not necessary that the object be a spherical ball and the concept of this invention be carried out by the use of other shaped objects. For example, a cube could be placed in an opening and caused to activate a switching device below which might be sensitive to the weight of the cube, its conductivity or other property. The lower disc can have more than one concentric hole or could have more than one hole along the same radius from the center to the first hole. This would be combined with a mating series of holes in the upper disc and the device for signaling could readily be adapted to discriminate between objects which fall through an outer circle and those which fall through an inner circle.

Thus, the signaling device can readily be adapted to perform many functions dependent upon the necessities of the particular function desired. For home use, the use of a clock face and a lower disc which rotates once in 12 hours is particularly east to use. While this invention had been described in the embodiment having a stationary upper disc and a movable lower disc, it is only necessary that one disc rotate with respect to the other. Thus, the lower disc could be stationary and the upper disc rotated or both discs could be rotated at different speeds or in different directions. Therefore, while certain embodiments of the invention have been described, the invention may be embodied in other specific forms not departing from the spirit or central characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A presettable time signaling device comprising:
- a frame;
- a first generally horizontal disc attached to said frame having a plurality of openings therein, said openings being arranged in a generally circular pattern;
- a second disc rotatably attached to said frame, located closely below the first disc and concentrically therewith having at least one opening therein, said opening being located so that it will become aligned with each of the openings in the first disc when said second disc is rotated concentrically below said first disc;
- means for rotating said second disc;
- an object having dimensions large enough so that it will be held in an opening in the first disc when this opening is not aligned with an opening in the second disc and small enough that will will pass completely through the openings in the first and second discs when said openings are aligned;
- object receiving means spaced below the under surface of said second disc a sufficient distance so that an object entering said opening in said second disc will fall completely through said opening into said object receiving means; and
- sensing means capable of activating a signal as a result of the passage of said object through an opening in said second disc.

2. The device of claim 1 wherein the number of openings in said first disc is equal to 12 times $n$ where $n$ is an integer and said second disc has one opening.

3. The device of claim 2 wherein said second disc rotates once each 12 hours and said first disc is stationary.

4. The device of claim 1 wherein said sensing means comprises a pair of electrical contacts positioned in the path of said object after said object has passed through said second disc said contacts adapted so that the passage of said object past said contacts closes an electrical circuit.

5. The device of claim 4 wherein at least one of said contacts is affixed to a movable arm and positioned so that passage of said object will physically move said arm to bring together said contacts.

6. The device of claim 4 wherein said object is electrically conductive and said contacts are positioned so that said object touches both of said contacts after said object has passed through said second disc thereby closing an electrical circuit.

7. The device of claim 1 wherein said sensing means comprises an arm member positioned in the path of said object and affixed so that passage of said object will physically move said arm member.

8. The device of claim 1 wherein said sensing means is a selective assembly capable of discriminating between objects of different sizes.

9. The device of claim 8 wherein said object is a spherical ball and said selective assembly is capable of discriminating between balls of two sizes comprising:
- a pair of transport rails attached to said frame, spaced apart so that a smaller ball will pass between said rails and a larger ball will not pass through said rails but will move along said rails to an exit area which is large enough to permit the downward passage of the larger ball therethrough;
- means for signaling the passage of a smaller ball; and
- separate means for signaling the passage of a larger ball.

10. The device of claim 9 wherein said means for signaling comprises:
- a sloped annular trough attached to said frame, positioned below said discs and located beneath the openings in the first circular disc, said trough having an exit opening at its low point large enough to permit the passage of balls;
- a shelf area attached to said frame having two openings therein, a first opening being large enough to permit the passage of the larger ball therethrough and the second opening being large enough to permit the passage of a smaller ball therethrough;
- a transporter tray resting on said shelf and capable of lateral movement from a starting position and having two openings therethrough, the first opening being positioned directly below said exit opening in said annular trough when said transporter tray is in a starting position and the second opening being positioned below the exit opening in said transporter rails when said transporter tray is in the starting position;
- means for guiding said transporter tray so that the openings in said transporter tray will become aligned with the openings in the shelf area when said transporter tray is moved laterally from its starting position;
- means for laterally moving said transporter tray;
- a first sensing means activated by the presence of a smaller ball in the first opening in said transporter tray; and
- a second sensing means activated by the presence of a larger ball in the second opening in said transporter tray.

* * * * *